United States Patent [19]

Matsumoto et al.

[11] Patent Number: 5,446,920
[45] Date of Patent: Aug. 29, 1995

[54] VARIABLE TRANSMISSION POWER TYPE TRANSMITTER

[75] Inventors: Yoshihiro Matsumoto, Kawasaki; Yoshifumi Toda, Tokyo, both of Japan

[73] Assignee: Fujitsu Limited, Kawasaki, Japan

[21] Appl. No.: 213,831

[22] Filed: Mar. 14, 1994

Related U.S. Application Data

[63] Continuation of Ser. No. 950,770, Sep. 24, 1992, abandoned, which is a continuation of Ser. No. 495,983, Mar. 20, 1990, abandoned.

[30] Foreign Application Priority Data

Mar. 20, 1989 [JP] Japan ................. 1-67875

[51] Int. Cl.6 .................................... H04B 1/04
[52] U.S. Cl. ................... 455/126; 455/127; 330/278
[58] Field of Search ............. 455/127, 92, 67.3, 69, 455/115, 343, 126; 330/278

[56] References Cited

U.S. PATENT DOCUMENTS

| | | | |
|---|---|---|---|
| 2,924,813 | 2/1960 | Meador | 455/92 |
| 4,395,245 | 7/1983 | Mitama | 455/115 |
| 4,447,783 | 5/1984 | Quick | 455/115 |
| 4,476,437 | 10/1984 | Fujiwara | 330/138 |
| 4,574,248 | 3/1986 | Snodgrass | 330/2 |
| 4,654,882 | 3/1987 | Ikeda | 455/117 |
| 4,870,698 | 9/1989 | Katsuyama et al. | 455/127 |

*Primary Examiner*—Edward F. Urban
*Attorney, Agent, or Firm*—Staas & Halsey

[57] ABSTRACT

A variable transmission power type transmitter comprises a transmission amplifier, a detecting circuit for detection of a transmission wave signal from the transmission amplifier, an automatic power control circuit for automatic control of the transmission power of the transmitter amplifier depending on the difference between a set value and a detected output of the detecting circuit, a set point providing circuit for generating set values and for selecting one of the set values to be supplied to the automatic power control circuit, and a transmission interruption detecting circuit for detecting existence or absence of the transmission wave signal by comparing the detected output of the detecting circuit with a reference value. The reference value is automatically generated from one of the set values in the set point providing circuit. Therefore, a variable resistor for adjusting the reference value and a adjustment process of the reference value are not required.

3 Claims, 5 Drawing Sheets

VARIABLE TRANSMISSION POWER TYPE TRANSMITTER

This application is a continuation of application Ser. No. 07/950,770, filed Sep. 24, 1992, now abandoned, which is a continuation of application Ser. No. 07/495,983, filed Mar. 20, 1990, now abandoned.

BACKGROUND OF THE INVENTION

1. Field of the Invention

The present invention relates to a variable transmission power type transmitter comprising a transmission interruption detecting circuit.

2. Description of the Related Art

In a mobile communication system such as an automobile telephone system, a portable telephone system, and the like, in order to prevent a mobile terminal from transmitting needlessly, and to reduce power consumption of the mobile terminal, the transmission power of the mobile terminal is controlled to be kept as low as possible while maintaining communication when electrical field strength is sufficiently high at the mobile terminal's position, and the transmission power is turned off when transmission is not required.

In order to realize these functions, a radio transmitter for a base station and a mobile terminal are provided with an automatic power control circuit (APC circuit) which is capable of variable control of the transmission power. The radio transmitter is also provided with a transmission interruption detecting circuit (or CAR-IND circuit: carrier indicator) for detecting existence or absence of the transmission output, in cooperation with the automatic power control circuit. The radio transmitter is further provided with a set point providing circuit for providing the automatic power control circuit with a set point by which the transmission power of the automatic power control circuit is controlled. The set point providing circuit discretely alters the value of the set point between the values corresponding to a minimum power $P_{min}$ and maximum power $P_{max}$, according to a command issued from a processor to control the whole apparatus.

The transmission interruption detecting circuit compares a detected value of a level of the transmitting power with a predetermined reference value $V_{ref}$ to decide whether the transmission power exists or not. The reference value $V_{ref}$ is manually adjustable to compensate for dispersion of each element. The values corresponding to the $P_{min}$ and $P_{max}$ are also manually adjustable for compensation.

In the aforementioned conventional circuit, adjustment of the reference value $V_{ref}$ is required after adjustment of the values corresponding to the $P_{max}$ and the $P_{min}$. Accordingly, there are so many portions to be adjusted that several production processes are required. Additionally, the scale of the circuit is large and its price is high, since a variable resistor for adjustment of the reference value $V_{ref}$ is required.

SUMMARY OF THE INVENTION

It is an object of the present invention to provide a variable transmission power type transmitter which can be made small in size and at low cost and which can be produced using a simple process without need for adjustment of the reference value $V_{ref}$.

In accordance with the present invention there is provided a variable transmission power type transmitter comprising a transmission amplifier unit for outputting a variable transmission power transmission wave signal, a detecting unit for detecting the level of the transmission wave signal, an automatic power control unit for automatic control of the transmission power of the transmitter amplifier unit depending on the difference between a set value and a detected output of the detecting unit, a set point providing unit for generating set values and for selecting one of the set valves to supply it to the automatic power control unit, and a transmission interruption detecting unit for detecting existence or absence of the transmission wave signal by comparing the detected output of the detecting unit with a reference value generated from one of the set values in the set point providing unit.

DESCRIPTION OF THE PREFERRED EMBODIMENTS

Before describing the preferred embodiments according to the invention, examples of aforementioned related art are given with reference to the accompanying drawings.

Figure 1:
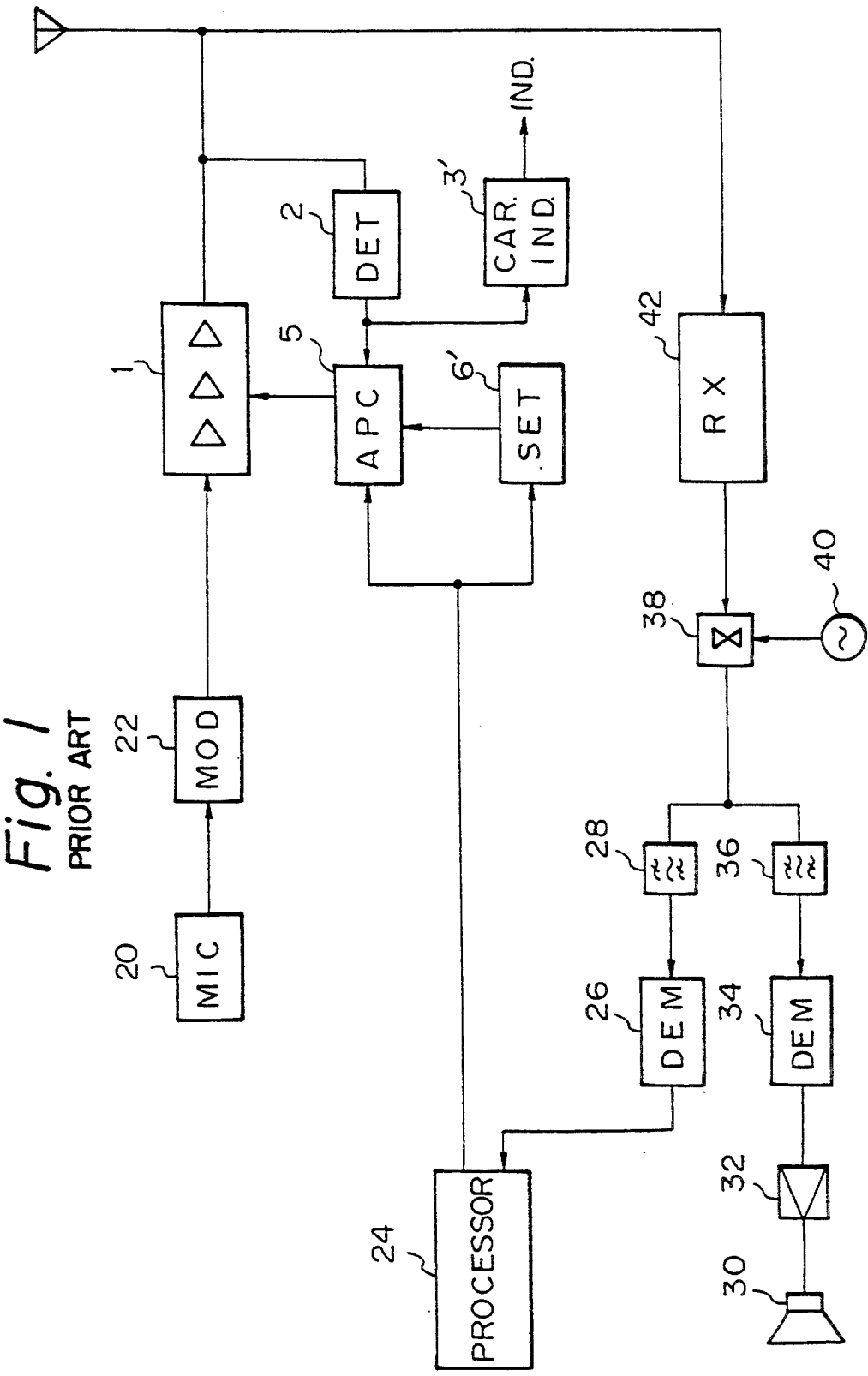
FIG. 1 is a block diagram showing an example of a mobile terminal.

FIG. 1 shows a construction of an example of a conventional mobile terminal.

A radio wave from a base station (not shown) includes information regarding electric field strength, etc., as well as information regarding an audio signal. A received signal including that information is amplified in a radio receiver 42, transformed into an intermediate frequency signal in a mixer 38 which mixes an input signal with a signal from a local oscillator 40, divided into a signal including audio information and a signal including information on the electrical field strength in band pass filters 36 and 28 to pass signals having corresponding frequencies only, respectively, and demodulated in demodulators 34 and 26, respectively.

A microprocessor 24 receives the information regarding the electric field strength, etc., decides on an adequate transmission power, and issues a command toward a set point providing circuit 6'. The set point providing circuit 6' selects a voltage value from among several predetermined voltage values corresponding to several transmission powers between $P_{max}$ and $P_{min}$, and supplies the selected voltage value to an automatic power control circuit (APC circuit) 5. The automatic power control circuit 5 and a detecting circuit 2 form a feedback path for a power amplifier circuit 1 to be controlled so that the level of transmission output becomes a value corresponding to the voltage value selected in the set point providing circuit 6'.

The microprocessor 24 also controls the ON/OFF of the power amplifier circuit 1 through the automatic power control circuit 5. The transmission output is interrupted when transmission is not required.

A transmission interruption detecting circuit (or a carrier indicator) 3' detects transmission interruption from an output of the detecting circuit 2 and indicates the result on an indicator (not shown).

Figure 2:
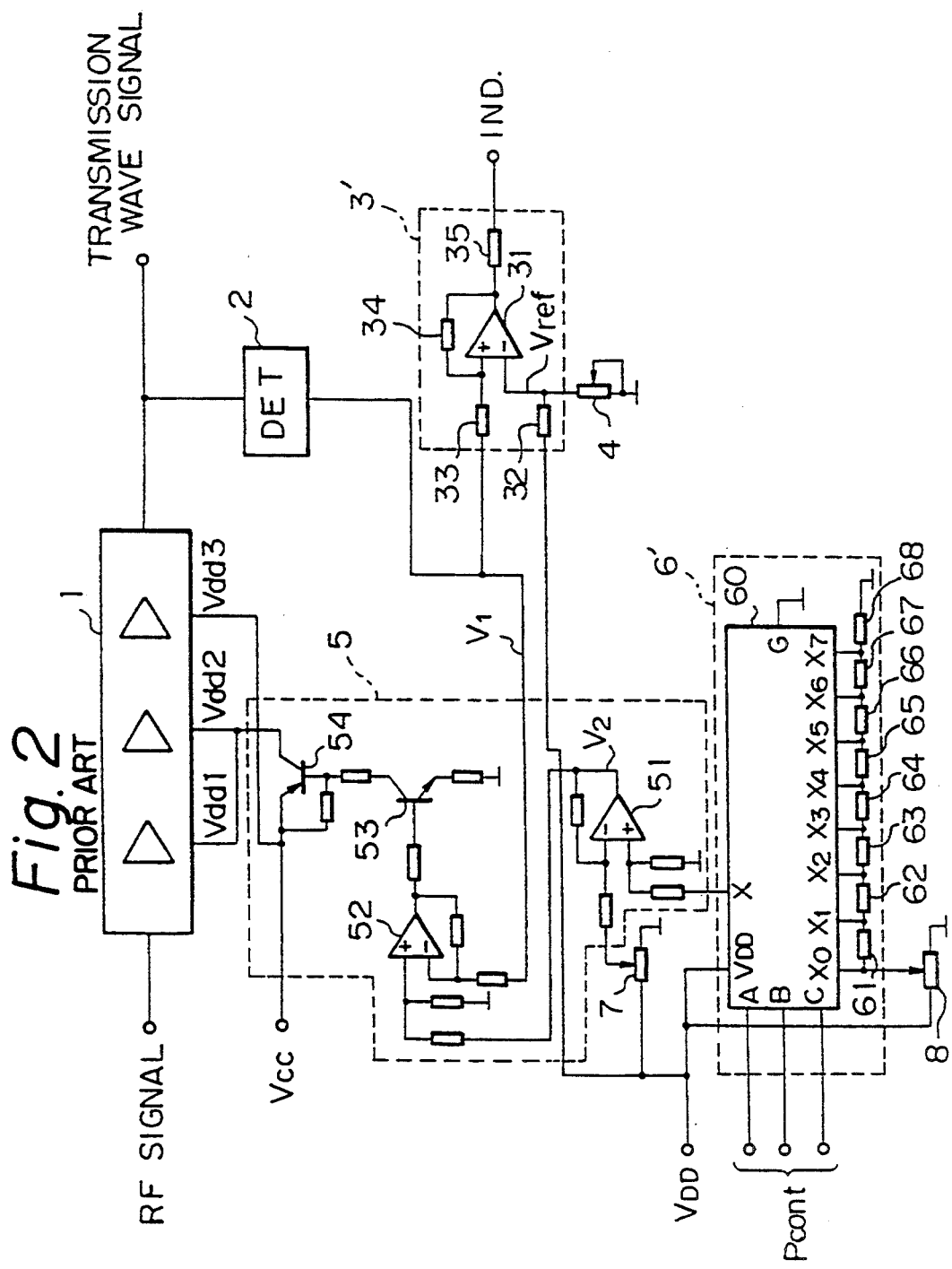
FIG. 2 is a circuit diagram of a conventional transmitter power variable transmitter.

FIG. 2 shows detailed constructions of the carrier indicator 3', the automatic power control circuit 5, and the set point providing circuit 6' shown in FIG. 1. The detecting circuit 2 detects the level of the transmission wave output to output a corresponding voltage $V_1$ by AM detection of the transmission wave output. The carrier indicator 3' compares the voltage $V_1$ with a predetermined reference voltage $V_{ref}$ to decide whether the transmission power exists or not. A variable resistor 4 is provided for correctly setting the reference voltage $V_{ref}$, and compensating for dispersion of each element. A variable resistor 7 is provided for adjusting transmission power when minimum transmission power $P_{min}$ is selected. A variable resistor 8 is provided for adjusting transmission power when maximum transmission power $P_{max}$ is selected.

The carrier indicator 3' is constructed to include a comparator 31 and resistors 32 to 35. The output of the detecting circuit 2 is input to one of the input terminals of the comparator 31, and the reference voltage $V_{ref}$ which is a voltages $V_{DD}$ divided by a resistor 32 and the variable resister 4 is input to the other input terminal of the comparator 31.

The set point providing circuit 6' is constructed to include a switching circuit 60 and a voltage dividing circuit comprising eight serially connected resistors 61 to 68. Each divided voltage from the voltage dividing circuit is input into one of the input terminals of the switching circuit 60 as set values $X_0$ to $X_7$, respectively. The switching circuit 60 selects one of the set values $X_0$ to $X_7$ depending on a power control signal $P_{cont}$ (binary signal of 3 bits) input to its control input terminals A, B, and C to output a set value X on its output terminal.

The automatic power control circuit 5 is constructed to include amplifiers 51 and 52, and driving transistor 53 and 54, and other elements which operate in conjunction therewith. The automatic power control circuit 5 supplies control outputs $Vdd_1$ and $Vdd_2$ having magnitudes depending on the set value X from the set point providing circuit 6', to the power amplifier circuit 1. The value of the minimum transmission power $P_{min}$ is adjustable by a minimum value adjusting voltage $V_{min}$ input from the minimum power adjusting variable register 7 to the amplifier 51. The transmission wave signal from the power amplifier circuit 1 is turned off by stopping application of a power voltage $V_{cc}$ to the transistor 54. The stopping of the power voltage $V_{cc}$ is performed in a part of the circuit which is not shown, according to an OFF signal from the microprocessor 24 shown in FIG. 1.

Operations of the circuits shown in FIG. 2 are described next.

The RF signal input to the power amplifier circuit 1 is amplified to be output as a transmission wave signal. The transmission wave signal is AM detected in the detecting circuit 2, and the power of the transmission wave signal currently output is detected as a detected output $V_1$. The detected output $V_1$ is input to the carrier indicator 3' and to the automatic power control circuit 5.

The optimum transmission power of the power amplifier circuit 1 is decided according to the electrical field strength. The power control signal $P_{cont}$ corresponding to the decided transmission power is input to the set point providing circuit 6'. The set point providing circuit 6' selects a set value corresponding to the power control signal $P_{cont}$ from among the $X_0$ to $X_7$ to be output to the automatic power control circuit 5 as a selected set value X.

In the automatic power control circuit 5, the amplifier 51 amplifies the result of subtraction of the divided voltage by the variable resistor 7 from the set value X, to output voltage $V_2$, the amplifier 52 amplifies the result of subtraction of the detected output $V_1$ from the output voltage $V_2$ to drive the transistor 53, and the control outputs $Vdd_1$ and $Vdd_2$ are generated. The power amplifier circuit 1 is controlled by the control outputs $Vdd_1$ and $Vdd_2$ so that desired transmission power is output.

Adjustment of values of the minimum and maximum transmission power is performed by the variable resistor 7 for adjustment of the minimum power, and the variable resistor 8 for adjustment of the maximum power, respectively.

Figure 3:
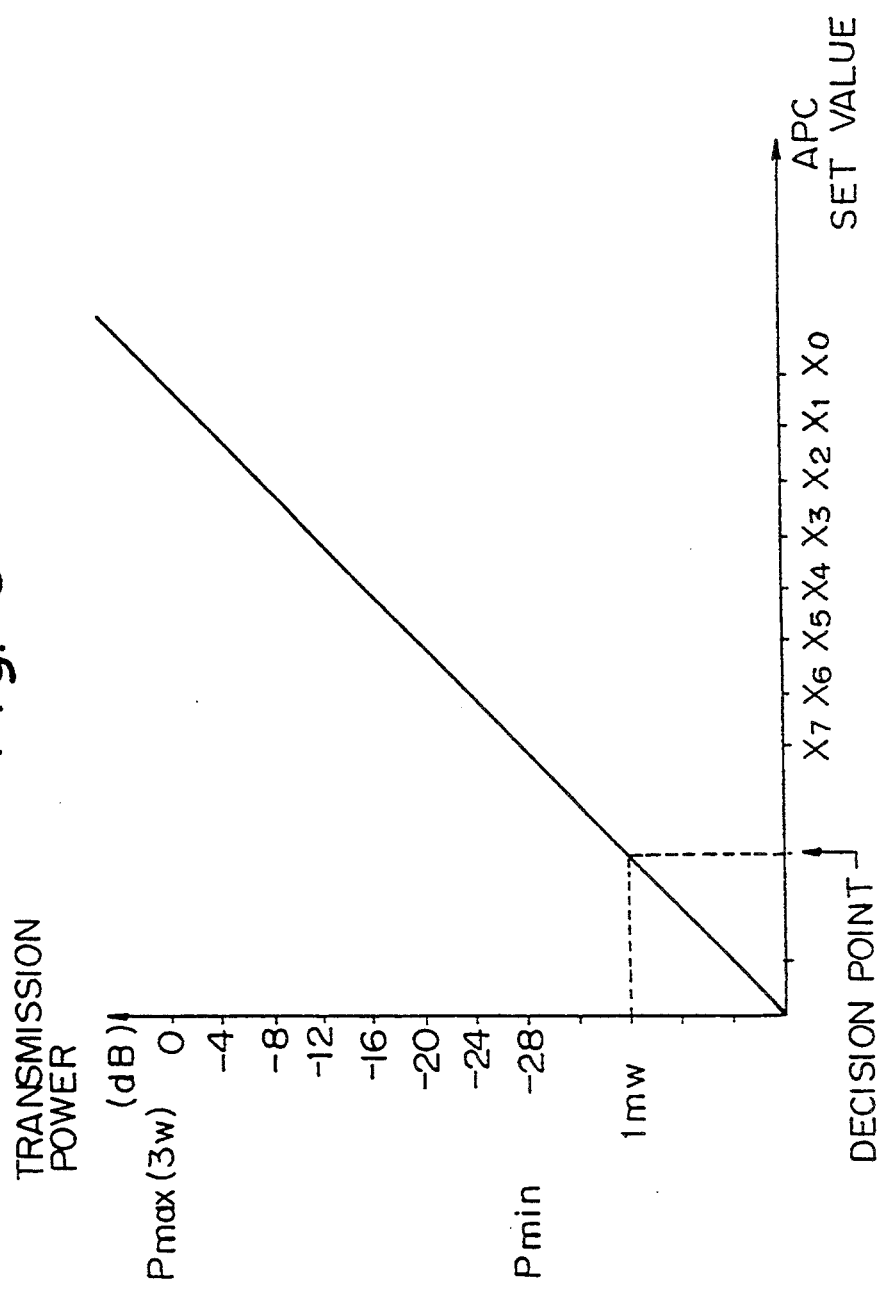
FIG. 3 is a diagram showing the characteristics of the transmission power against the set values.

FIG. 3 shows the characteristics of the transmission power in the power amplifier 1 corresponding to the set values $X_0$ to $X_7$. The value of the minimum transmission power $P_{min}$ corresponding to the set value $X_7$ can be adjusted with the variable resistor 7 for adjustment of the minimum power, and the value of the maximum transmission power $P_{max}$ corresponding to the set value $X_0$ can be adjusted with the variable register 8 for adjustment of the maximum power.

The carrier indicator 3' (FIG. 2) is a circuit for generating a signal to indicate whether the transmission wave signal from the power amplifier circuit 1 exists or not. The detected output $V_1$ from the detecting circuit 2 is compared with the reference value $V_{ref}$ generated in the variable resistor 4 for adjustment of the reference value. If the detected value $V_1$ is lower than the reference value $V_{ref}$, then the transmission wave signal is determined not to exist. The reference value $V_{ref}$ is required to be set lower than a value corresponding to the minimum transmission power $P_{min}$. Generally, the reference value $V_{ref}$ is set at a value corresponding to a transmission power which is lower than the minimum transmission power $P_{min}$ (for example, lower than 1 mW) by more than 4 dB (FIG. 3).

In the aforementioned conventional circuits, the reference value $V_{ref}$ is required to be additionally adjusted with the variable register 4, after the maximum value $P_{max}$ and the minimum value $P_{min}$ of the transmission power have been adjusted with the variable resistor 8 and the variable resistor 7, respectively. Therefore, there are so many portions to be adjusted that production processes are quite numerous. Additionally, the scale of the circuits is large and their cost is high, since a variable resistor for adjustment of the reference value $V_{ref}$ is required.

Figure 4:
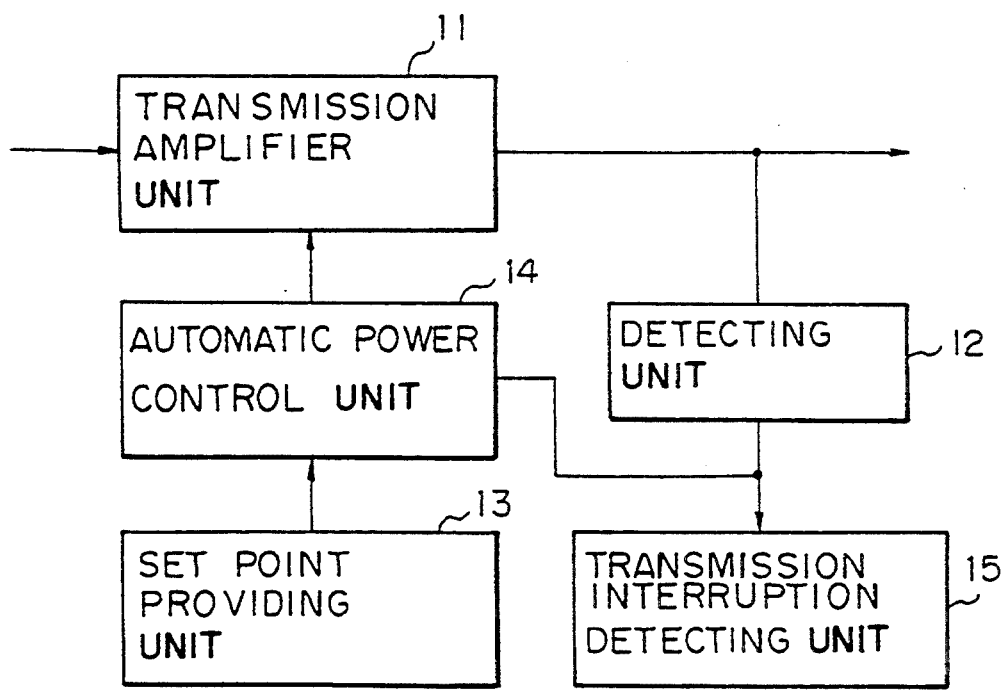
FIG. 4 is a block diagram of a basic construction of the present invention.

FIG. 4 shows a basic construction of the present invention.

A transmission amplifier unit 11 outputs a transmission wave signals having variable transmission power. A detecting unit 12 detects the transmission wave signal from the transmission amplifier unit 11. A set point providing unit 13 generates set values corresponding to each value of the transmission power. An automatic power control unit 14 automatically controls the transmission amplifier unit 11 so as to output the transmission power corresponding to the set value of the set point providing unit 13, referring to the detected output of the detecting unit 12. The transmission interruption detecting unit 15 decides existence or absence of the transmission wave signal by comparing the detected output of the detecting unit 12 with a reference value generated from a minimum set value in the set point providing unit 13.

An adequate reference value can be automatically generated, for example, by dividing the minimum set value. Therefore, an adjusting unit for generating the reference value is not required, and a working process for adjustment of the reference value is not required.

Figure 5:
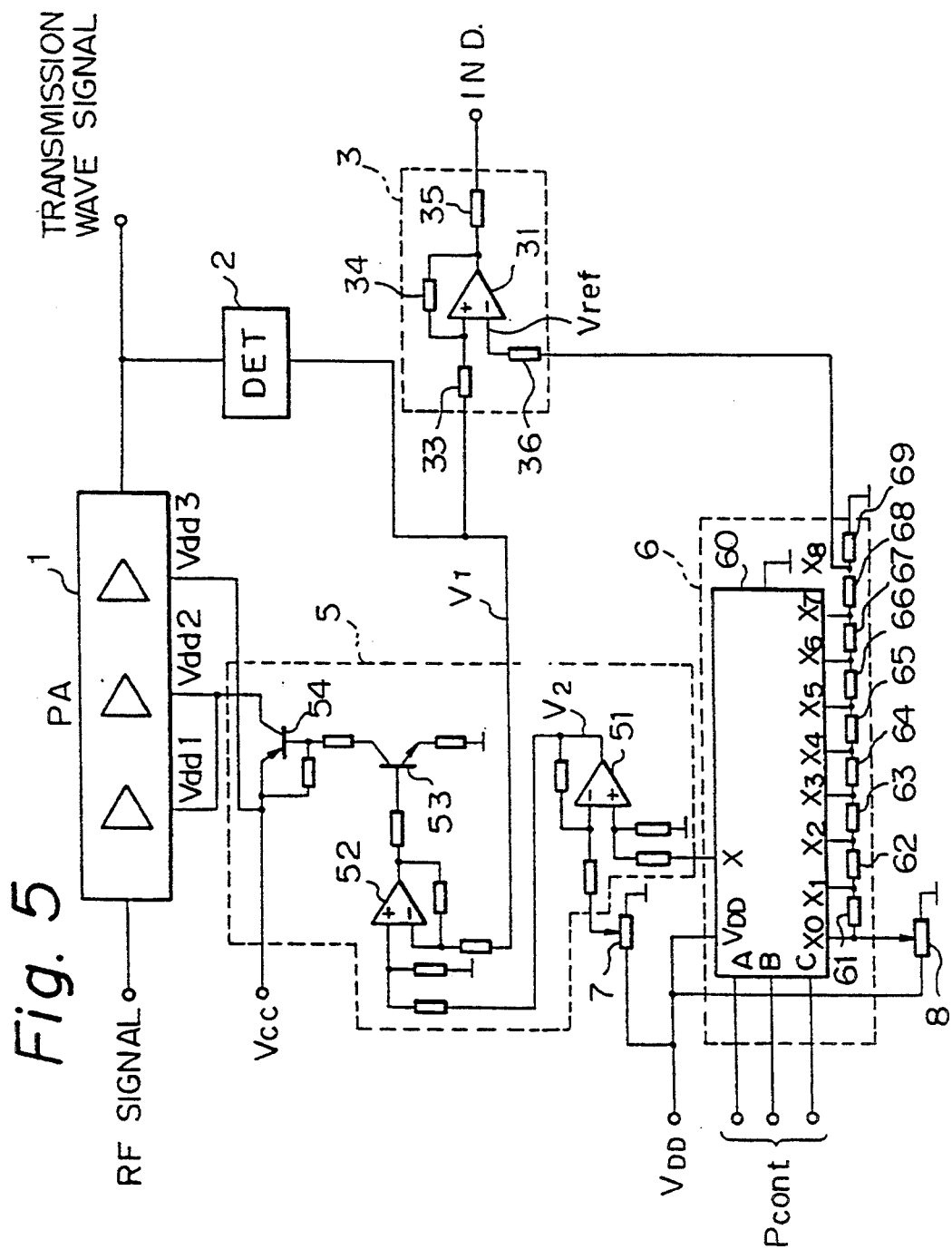
FIG. 5 is a circuit diagram of an embodiment of the present invention.

FIG. 5 represents an embodiment of the present invention. The same reference numerals as used in FIG. 2 are used for constituents which have the same construction as those in FIG. 2. The circuits shown in FIG. 5 differ from those in FIG. 2 in that the variable resistor 4 for adjustment of the reference value is not used. The reference value $V_{ref}$ is generated by dividing the set value $X_7$ with serially connected resistors 68 and 69. The values of the resistors 68 and 69 are selected so that the generated reference value coincides with a decision point to decide the transmission interruption as shown in FIG. 3 (for example, a value lower than the set value $X_7$ by more than 4 dB).

In this construction, the reference value $V_{ref}$ for the carrier indicator 3 is automatically set when the maximum and minimum transmission power of the power amplifier circuit 1 is adjusted with the variable resistors 8 and 7. Accordingly, an adjustment process of the reference value $V_{ref}$ is left out and the variable resistor 4 for adjustment is not required.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A variable transmission power type transmitter, comprising:
   transmission amplifier means for receiving an RF signal at an input side and for outputting a transmission wave signal having a variable transmission power at an output side;
   detection means, operatively connected to the output side of said transmission amplifier means, for producing a detected voltage corresponding to the variable transmission power of the transmission wave signal output from said transmission amplifier means;
   power selection means for selecting one of a plurality of power level settings as a selected power level setting and for producing a reference voltage based on one of the plurality of power level settings;
   power control means, operatively connected to said detecting means, said power selection means and said transmission amplifier means, for receiving the detected voltage from said detection means and for automatic control of the variable transmission power of said transmission amplifier means based on a difference between the detected voltage and the selected power level setting; and
   transmission interruption detection means, operatively connected to said detection means and said power selection means, for comparing the reference voltage to the detected voltage to produce a comparison signal and for detecting absence of the transmission wave signal at the output side of said transmission amplifier means based on the comparison signal,
   said power selection means producing the plurality of power level settings,
   the plurality of power level settings including a minimum power level setting and a maximum power level setting,
   said power selection means dividing the minimum power level setting to produce the reference voltage, the plurality of power level settings being voltage levels, and
   the reference voltage being automatically adjusted in conjunction with adjustment of the minimum power level setting.

2. A variable transmission power amplifier supplied with an input signal, a power control signal and first and second power voltages, the first power voltage being greater than the second power voltage, comprising:
   a power amplifier receiving the input signal and generating an output signal based on the input signal and at least one control output signal;
   a variable resistor connected between the first and second voltages and being adjustable to generate a variable output signal which determines a maximum power of the output signal;
   a set point providing circuit including
      a plurality of resistors connected in series and having first and second ends, the first end being coupled to the variable resistor to receive the variable output signal, and the second end being connected to receive the second power voltage, a connection point between two of the resistors nearest to the second end being used to generate a reference voltage, and
      a switching circuit coupled to receive the power control signal and having inputs coupled to corresponding connection points between the plurality of resistors except for the connection point between the two resistors nearest to the second end, each of the connection points coupled to the inputs of the switching circuit generating a set value signal which is different from the set value signals of the other connection points, the switching circuit outputting a selected one of the set values signals, based on the power control signal;
   a detector coupled to receive the output signal from the power amplifier, which generates a detected output signal based on the output signal;
   an automatic power control circuit coupled to the detector and the set point providing circuit, which generates the at least one control output based on the selected one of the set value signals and the detected output signal; and
   a transmission interruption detecting circuit coupled to the detector and the set point providing circuit, for generating an indicator signal indicating an interruption in transmission power output from the power amplifier, based on the reference voltage and the detected output signal.

3. A variable transmission power type transmitter, comprising:
   transmission amplifier means for receiving an RF signal at an input side and for outputting a transmission wave signal having a variable transmission power at an output side;

detection means, operatively connected to the output side of said transmission amplifier means, for producing a detected voltage corresponding to the variable transmission power of the transmission wave signal output from said transmission amplifier means;

power selection means for selecting one of a plurality of power level settings as a selected power level setting and for producing a reference voltage based on one of the plurality of power level settings;

power control means, operatively connected to said detecting means, said power selection means and said transmission amplifier means, for receiving the detected voltage from said detection means and for automatic control of the variable transmission power of said transmission amplifier means based on a difference between the detected voltage and the selected power level setting; and transmission interruption detection means, operatively connected to said detection means and said power selection means, for comparing the reference voltage to the detected voltage to produce a comparison signal and for detecting absence of the transmission wave signal at the output side of said transmission amplifier means based on the comparison signal, said power selection means producing the plurality of power level settings, said power selection means dividing one of the plurality of power level settings to produce the reference voltage, the plurality of power level settings being voltage levels, and the reference voltage being automatically adjusted in conjunction with adjustment of the one of the plurality of power level settings.

* * * * *